United States Patent [19]

Ohmura et al.

[11] Patent Number: 5,541,243
[45] Date of Patent: Jul. 30, 1996

[54] THERMOPLASTIC RESIN COMPOSITION

[75] Inventors: Haruo Ohmura; Tomohiko Tanaka, both of Mie, Japan

[73] Assignee: Mitsubishi Chemical Corporation, Tokyo, Japan

[21] Appl. No.: 268,272

[22] Filed: Jun. 30, 1994

[30] Foreign Application Priority Data

Jul. 16, 1993 [JP] Japan .................. 5-176889

[51] Int. Cl.$^6$ .................. C08K 5/51; C08L 71/12
[52] U.S. Cl. .................. 525/128; 524/609; 525/390; 525/397; 525/537
[58] Field of Search .................. 525/390, 397, 525/537; 524/128, 609

[56] References Cited

U.S. PATENT DOCUMENTS

| | | |
|---|---|---|
| 5,021,497 | 6/1991 | Ohara et al. . |
| 5,028,656 | 7/1991 | Okabe et al. .................. 525/395 |
| 5,183,871 | 2/1993 | Yamasaki et al. .................. 525/241 |
| 5,185,392 | 2/1993 | Nonaka et al. .................. 524/425 |
| 5,214,083 | 5/1993 | Kodaira et al. .................. 525/390 |
| 5,219,940 | 6/1993 | Nakano .................. 525/397 |
| 5,242,990 | 9/1993 | Arashiro et al. .................. 525/396 |

FOREIGN PATENT DOCUMENTS

| | | |
|---|---|---|
| 0405936 | 1/1991 | European Pat. Off. . |
| 0407926 | 1/1991 | European Pat. Off. . |
| 0472960 | 3/1992 | European Pat. Off. . |
| 3939761 | 1/1991 | Germany . |
| 92/01749 | 2/1992 | WIPO . |

OTHER PUBLICATIONS

Chemical Abstracts vol. 84, No. 16, Abstract No. 106514v (Apr. 1976).

*Primary Examiner*—Marion E. McCamish
*Assistant Examiner*—Helen F. Lee
*Attorney, Agent, or Firm*—Dilworth & Barrese

[57] ABSTRACT

A thermoplastic resin composition comprising (a) a polyphenylene sulfide resin, (b) a polyphenylene ether resin, (c) a specific organophosphorus compound, and (d) a basic compound is disclosed. The composition exhibits improved compatibility between resinous components (a) and (b) and therefore provides a molded article having high mechanical strength and excellent appearance.

4 Claims, No Drawings

THERMOPLASTIC RESIN COMPOSITION

FIELD OF THE INVENTION

This invention relates to a thermoplastic resin composition comprising a polyphenylene sulfide resin and a polyphenylene ether resin, and more particularly to a thermoplastic resin composition which provides molded articles with excellent mechanical strength, thermal rigidity, and appearance and which is useful as engineering plastics for machine parts, e.g., connectors, ignition manifolds, gears, bumpers, and coil sealants.

BACKGROUND OF THE INVENTION

Polyphenylene sulfide resin (hereinafter abbreviated as PPS) is known as a high-melting and heat resistant crystalline resin with excellent fluidity, organic solvent resistance, electrical characteristics, and flame retardance. However, for use as a molding material for such articles as sliding parts and carriages for optical discs, PPS has poor stability in extrusion and injection molding due to the low degree of polymerization reached. Further, since the glass transition temperature of PPS is about 90° C., which is not very high, PPS molded articles undergo a considerable reduction in rigidity at high temperatures. Thermal rigidity of PPS can be improved by compounding with inorganic fillers, such as glass fiber, carbon fiber, talc, and silica, as suggested in U.S. Pat. Nos. 4,737,539 and 4,009,043. However, molded articles obtained from PPS compositions containing these inorganic fillers tend to suffer from deterioration of appearance or warpage.

In order to prevent warpage and to improve hue, U.S. Pat. No. 5,185,392 proposes a polyarylene sulfide composition comprising (A) 100 parts by weight of a polyarylene sulfide, (B) 0.01 to 10 parts by weight of an organic bisphosphite having the formula:

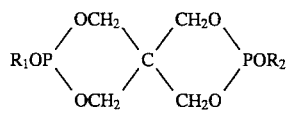

wherein $R_1$ and $R_2$ each is an alkyl group, an alkyl group having at least one substituent, an aryl group, an aryl group having at least one substituent or an alkoxy group, (C) 0 to 400 parts by weight of an inorganic filler, and (D) 0.01 to 5 parts by weight of at least one alkoxysilane selected from the group consisting of aminoalkoxysilanes, epoxyalkoxysilanes, mercaptoalkoxysilanes, and vinylalkoxysilanes. The molded articles obtained from this composition have poor appearance while having improved flexural strength.

On the other hand, a polyphenylene ether resin (hereinafter abbreviated as PPE) is recognized as an engineering plastic with heat resistance, dimensional stability, non-hygroscopicity, and excellent electrical characteristics. However, PPE has poor moldability due to its low melt-flow characteristics and also has insufficient oil resistance and insufficient impact resistance.

Hence, various polymer blends mainly comprising PPS and PPE have hitherto been proposed in an attempt to provide a molding material in which the above-described drawbacks are compensated for while retaining their own advantages.

For example, blending PPE and PPS to improve moldability of PPE has been suggested as disclosed in JP-B-56-34032 (the term "JP-B" as used herein means an "examined published Japanese patent application"). Such a mere polymer blend, though achieving an improvement in moldability, exhibits poor affinity at the interface between the PPE and the PPS because the two resins are essentially incompatible with each other. As a result, the composition undergoes phase separation (delamination) on molding, failing to provide molded articles having satisfactory mechanical strength.

In order to overcome the above-described problem of incompatibility between PPS and PPE, several proposals have been made to date. For instance, JP-A-1-259060 (the term "JP-A" as used herein means an "unexamined published Japanese patent application") suggests that a combination of (a) carboxylic acid-, hydroxyl- or epoxy-modified PPE obtained by melt-kneading PPE with maleic anhydride, 2-hydroxyethyl acrylate, glycidyl methacrylate, etc. and (b) similarly functionalized PPS provides a resin composition having excellent mechanical strength. None of these proposals, however, results in sufficient compatibility between PPE and PPS to achieve sufficient improvement in impact resistance.

SUMMARY OF THE INVENTION

An object of the present invention is to provide a thermoplastic resin composition comprising PPS and PPE with extremely high compatibility between PPS and PPE and capable of providing molded articles excellent in appearance, mechanical strength, and solvent resistance.

The present invention relates to a thermoplastic resin composition comprising (a) from 10 to 90% by weight of PPS, (b) from 10 to 90% by weight of PPE, (c) from 0.1 to 10 parts by weight, per 100 parts by weight of the total resinous components (a) and (b), of an organophosphorus compound selected from the group consisting of an alkylaryl phosphite, an aryl phosphite, a heat-resistant diphosphite and a phosphonite, and (d) from 0.1 to 10 parts by weight, per 100 parts by weight of the total resinous components (a) and (b), of a basic compound.

The specific phosphite or phosphonite compound as component (c) and the basic compound as component (d), when combined with PPS and PPE, markedly increase the compatibility between PPS and PPE to provide a polymer alloy having excellent mechanical strength.

DETAILED DESCRIPTION OF THE INVENTION

PPS as component (a) is a crystalline resin mainly comprising a repeating unit represented by formula (I):

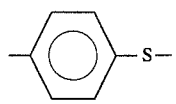

From the standpoint of physical properties such as heat resistance, component (a) is preferably a homopolymer of the repeating unit (I) or a copolymer containing the repeating unit (I) in a molar ratio of at least 80 mol %, and more preferably at least 90 mol %. Other repeating units in the copolymer, the molar ratio of which is preferably not more than 20 mol %, includes the following copolymerizable units.

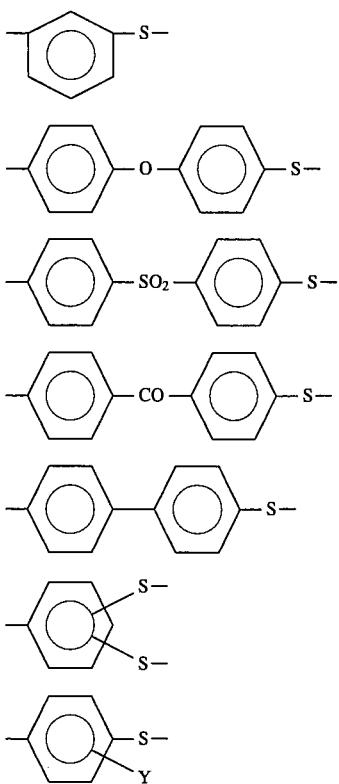

wherein Y represents an alkyl group, a phenyl group or an alkoxy group.

PPS having a substantially linear structure is preferred from the standpoint of physical properties of molded articles. As long as the physical properties of molded articles are not substantially impaired, PPS having a crosslinked structure can also be used as component (a). Crosslinked PPS includes polymerization-crosslinked PPS prepared by conducting polymerization in the presence of an effective amount of a crosslinking agent (e.g., a trihalobenzene) or thermally crosslinked PPS prepared by heating PPS in the presence of oxygen.

PPS to be used in the present invention preferably has a melt viscosity of from 100 to 100,000 poise, more preferably from 500 to 50,000 poise, and most preferably from 500 to 20,000 poise, at 300° C. If the melt viscosity is outside this range, too high or too low fluidity makes molding difficult.

PPS can be prepared in accordance with, for example, the process described in JP-B-45-3368, by which PPS of relatively low molecular weight is produced; the process disclosed in JP-B-52-12240, by which linear PPS of relatively high molecular weight is produced; or a process in which a low-molecular weight PPS is heated in the presence of oxygen to obtain crosslinked PPS, or any of these processes with necessary modifications.

In the present invention, modified PPS can also be used as component (a).

Modifiers which are reacted with PPS to introduce a functional group into PPS include (i) a compound containing a mercapto group or a disulfide group and a hydroxyalkyl group in the molecule thereof, selected from dithioerythritol, 2,2'-dithiodiethanol, 3,3'-dithiodipropanol, 1,1'-dithioglycerol, 1-thioglycerol, 3-mercapto-2-butanol, 2-mercaptoethanol, 1-mercapto-2-propanol, and 2,3-dimercapto-1-propanol, (ii) a sulfosuccinic diester selected from sodium di(2-ethylhexyl) sulfosuccinate, di(2-ethylhexyl) sulfosuccinate, sodium dimethyl sulfosuccinate, sodium diethyl sulfosuccinate, sodium diisopropyl sulfosuccinate, sodium diheptyl sulfosuccinate, sodium dioctyl sulfosuccinate, sodium dinonyl sulfosuccinate, sodium didecyl sulfosuccinate, and sodium ditridecyl sulfosuccinate, (iii) a compound having a mercapto group or a disulfide group and a carboxyl group in the molecule thereof, selected from thiomalic acid, mercaptobenzoic acid, 5,5'-dithiobis(2-nitrobenzoic acid), 4,4'-dithiodi(n-butyric acid), dithiodiacetic acid, 2,2'-dithiodipropionic acid, 3,3'-dithiodipropionic acid, mercaptoacetic acid, 2-mercaptopropionic acid, mercaptovaleric acid, dithiodibenzoic acid, thiosalicylic acid, 3-(p-mercaptophenyl)propionic acid, and alkyl esters or alkali metal salts thereof, and (iv) an α,β-unsaturated carboxylic acid selected from maleic anhydride, itaconic acid, acrylic acid, and methacrylic acid.

Modified PPS can easily be prepared by reacting PPS with 0.1 to 100 parts by weight, and preferably 1 to 20 parts by weight, of the above-mentioned modifier per 100 parts by weight of PPS in an organic solvent capable of dissolving or at least partly dissolving PPS at a temperature of from 170° to 300° C. While it is desirable that the organic solvent to be used is capable of dissolving the starting PPS, organic solvents capable of partly swelling PPS may also be used. Examples of suitable organic solvents include aromatic solvents, e.g., biphenyl, toluene, and xylene; halogenated aromatic hydrocarbon solvents, e.g., chlorobenzene, dichlorobenzene, and chloronaphthalene; and aprotic polar solvents, e.g., N-methyl-2-pyrrolidone, dimethylimidazolidinone, dimethylacetamide, and sulfolane.

Of the above-mentioned modified PPS, carboxyl-containing PPS can also be obtained through a reaction in a molten state. For example, 100 parts by weight of PPS and from 0.01 to 20 parts by weight, and preferably from 0.1 to 10 parts by weight, of a modifier are mixed and melt-kneaded: in an extruder or a kneading machine at a temperature of from 150° to 350° C., and preferably from 280° to 340° C.

PPE as component (b) is a homo- or copolymer having a repeating unit represented by formula (IX):

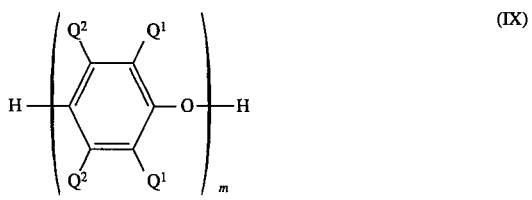

wherein plural $Q^1$ groups, which may be the same or different, each represents a halogen atom, a primary or secondary alkyl group, an aryl group, an aminoalkyl group, a halo-hydrocarbon group, a hydrocarbon oxy group, or a halo-hydrocarbon oxy group; plural $Q^2$ groups, which may be the same or different, each represents a hydrogen atom, a halogen atom, a primary or secondary alkyl group, a halo-hydrocarbon group or a halo-hydrocarbon oxy group; and m represents a degree of polymerization ranging from 40 to 250.

In formula (IX), suitable primary alkyl groups as represented by $Q^1$ or $Q^2$ are methyl, ethyl, n-propyl, n-butyl, n-amyl, isoamyl, 2-methylbutyl, 2,3-dimethylbutyl, 2-, 3- or 4-methylpentyl, and heptyl groups. Examples of suitable secondary alkyl groups as $Q^1$ or $Q^2$ are isopropyl, sec-butyl, and 1-ethylpropyl groups. $Q^1$ is in most cases an alkyl group or a phenyl group and, particularly, an alkyl group having from 1 to 4 carbon atoms. $Q^2$ is in most cases a hydrogen atom.

Suitable PPE include poly(2,6-dimethyl-1,4-phenylene ether), poly(2,6-diethyl-1,4-phenylene ether), poly( 2,6- dipropyl-1,4-phenylene ether), poly(2-methyl-6-ethyl-1,4-phenylene ether), poly(2-methyl-6-propyl-1,4-phenylene ether), poly(2-ethyl-6-propyl-1,4-phenylene ether), a 2,6-dimethylphenol/ 2,3,6-trimethylphenol copolymer, a 2,6-dimethylphenol/ 2,3,6-triethylphenol copolymer, a 2,6-diethylphenol/ 2,3,6-trimethylphenol copolymer, a 2,6-dipropylphenol/ 2,3,6-trimethylphenol copolymer, styrene-grafted poly(2,6-dimethyl-1,4-phenylene ether), and a styrene-grafted 2,6-dimethylphenol/2,3,6-trimethylphenol copolymer. Preferred of these are poly(2,6-dimethyl-1,4-phenylene)ether and a random copolymer of 2,6-dimethyl-1,4-phenylene ether and 2,3,6-trimethyl-1,4-phenylene ether.

PPE to be used here usually has such a molecular weight as to provide an intrinsic viscosity of from about 0.2 to 0.8 dl/g in chloroform at 30° C.

PPE is generally prepared by oxidative coupling of phenylene ether monomer(s) such as those employed in making the above-mentioned PPE. A number of catalyst systems are known for use in oxidative coupling of phenylene ether monomers. Any of these known catalysts can be used in the present invention without any particular limitation. For example, combinations of at least one heavy metal compound of copper, manganese, cobalt, etc. with various other substances can be used.

PPE as component (b) may be one modified with maleic anhydride, glycidyl methacrylate, hydroxyethyl methacrylate, styrene, a vinylalkoxysilane, an epoxyalkoxysilane, etc. Modification of PPE with these modifiers can be carried out in the same manner as described for modified PPS.

The organophosphorus compound as component (c) includes alkylaryl phosphites, such as phenyldiisodecyl phosphite, phenyldi(tridecyl) phosphite, diphenylisooctyl phosphite, diphenylisodecyl phosphite, diphenyltridecyl phosphite, 4,4'-butylidene-bis(3-methyl-6-t-butylphenylditridecyl) phosphite, and hexatridecyl-1,1,3-tris(2-methyl- 4-hydroxy-5-t-butylphenyl)butane triphosphite; aryl phosphites, such as triphenyl phosphite, tris(nonylphenyl) phosphite, tris(2,4-di-t-butylphenyl) phosphite, and tris(biphenyl) phosphite; heat-resistant phosphites, such as distearylpentaerythritol diphosphite, diisodecylpentaerythritol diphosphite, di(2,4-di-t-butylphenyl)pentaerythritol diphosphite, di(2,6-di-t-butyl-4-methylphenyl)pentaerythritol diphosphite, di(nonylphenyl)pentaerythritol diphosphite, and phenyl-bisphenol A pentaerythritol diphosphite; and phosphonites, such as tetrakis( 2,4-di-t-butylphenyl)-4,4'-biphenylene diphosphonite and tetrakis( 2,6-dimethylphenyl)-4,4'-biphenylene diphosphonite. Those having a molecular weight of from 120 to 2,000 are usually used.

Preferred among the above-enumerated organophosphorus compounds are bis(2,6-di-t-butyl-4-methylphenyl)pentaerythritol diphosphite, tris(2,4-di-t-butylphenyl) phosphite, triphenyl phosphite, and tetrakis(2,4-di-t-butylphenyl)-4,4'-biphenylene diphosphonite. Phosphates, such as triphenyl phosphate and tricresyl phosphate, and low heat-resistant alkyl phosphites, such as tris(isodecyl) phosphite and tris(tridecyl) phosphite, have no compatibilizing effect, only to provide molded articles having low impact strength.

The basic compound as component (d) includes alkali metal hydroxides, such as sodium hydroxide and potassium hydroxide; alkali metal carbonates, such as sodium carbonate and potassium carbonate; alkali metal alcoholates, such as sodium methoxide, sodium ethoxide, sodium n-butoxide, and potassium t-butoxide; and alkali metal acetates, such as potassium acetate and cesium acetate, with sodium methoxide, sodium ethoxide, sodium hydroxide, potassium carbonate, and cesium acetate being preferred.

If desired, the thermoplastic resin composition comprising components (a), (b), (c), and (d) may contain various compounding additives as long as the properties of the resin composition are not impaired. For example, the composition may contain, per 100 parts by weight of the total resinous components (a) and (b), 5 to 40 parts by weight of thermoplastic elastomers as impact modifiers; 5 to 40 parts by weight of inorganic fillers, such as metal oxides (e.g., silicon oxide, titanium oxide, zinc oxide, iron oxide, magnesium oxide, alumina), silicates (e.g., kaolin, clay, mica, bentonite, silica, talc, wollastonite, montmorillonite), iron hydroxide, hydrotalcite, calcium carbonate, magnesium carbonate, barium sulfate, calcium sulfate, boron nitride, silicon carbide, glass beads, glass fiber, alumina fiber, silica-alumina fiber, zirconia fiber, silicon nitride fiber, boron nitride fiber, asbestos fiber, silicon carbide fiber, calcium silicate fiber, gypsum fiber, polyamide fiber, phenol fiber, silicon carbide whiskers, potassium titanate whiskers, and carbon fiber; 2 to 20 parts by weight of various flame retardants; and 0.1 to 5 parts by weight of crystallization accelerators (nucleating agents), silane coupling agents (e.g., mercaptosilane, vinylsilane, aminosilane, and epoxysilane), antioxidants, heat stabilizers, ultraviolet absorbents, hindered amine type photo stabilizers, and colorants. For the purpose of controlling the degree of crosslinking of PPS, a thiophosphinic acid metal salt as a crosslinking accelerator or a dialkyltin dicarboxylate or aminotriazole as a crosslinking inhibitor may be added to the composition in an amount of from 0.1 to 5 parts by weight per 100 parts by weight of the total resinous components (a) and (b).

The thermoplastic resin composition may further contain various catalysts for accelerating the reaction of the components. Useful catalysts include tertiary amines, such as tri-n-butylamine, triethylamine, triphenylamine, benzyldimethylamine, tris(dimethylamino)methylphenol, and 4-(N,N-dimethyl)pyridine; quaternary ammonium salts, such as triethylbenzylammonium chloride, tetramethylammonium chloride, and trioctylmethylammonium chloride; quaternary phosphonium salts, such as tetrabutylphosphonium bromide and tetraphenylphosphonium bromide; imidazole compounds, such as 2-ethyl-4-methylimidazole, 2-methylimidazole, and 1-cyanoethyl-2-methylimidazole; acetic acid metal salts, such as zinc acetate and cobalt acetate; interesterification accelerators, such as antimony trioxide and tetraoctyl titanate; and basic compounds, such as pyridine.

The catalyst is added in an amount of less than 10 parts, and preferably less than 5 parts, per 100 parts by weight of the total resinous components (a) and (b). If the amount of the catalyst is 10 parts or more, gas will be evolved during molding, resulting in deterioration of appearance and physical properties of the molded articles.

The thermoplastic elastomer (impact modifier) as noted above which can be used in the present invention for improvement of impact resistance of resinous components (a) and (b) is a polymer having a modulus of elasticity in three-point bending of not higher than 1000 kg/cm$^2$ as measured in accordance with JIS K7203 and a glass transition temperature of not higher than −10° C. Examples of such thermoplastic elastomers are polyolefin type elastomers, diene type elastomers, polystyrene type elastomers, polyamide type elastomers, polyester type elastomers, polyurethane type elastomers, fluorine type elastomers, and silicon type elastomers, with polyolefin type elastomers and polystyrene type elastomers being preferred.

Suitable examples of polyolefin type elastomers are polyisobutylene, an ethylene-propylene copolymer, an ethylene-propylene-non-conjugated diene copolymer, an ethylenebutene-1 copolymer, an ethylene-propylene-butene-1 copolymer, an ethylene-hexene-1 copolymer, an ethylene-vinyl acetate copolymer, an ethylene-acrylic acid copolymer, an ethylene-methacrylic acid copolymer, an ethylene-glycidyl acrylate copolymer, an ethylene-glycidyl methacrylate copolymer, an ethylene-vinyl acetate-glycidyl methacrylate copolymer, an ethylene-maleic acid copolymer, and an ethylene-maleic anhydride copolymer.

Examples of diene type elastomers include polybutadiene, hydrogenatgd polybutadiene, polyisoprene, hydrogenated polyisoprene, a butadiene-styrene random copolymer, and a hydrogenated butadiene-styrene random copolymer.

Examples of polystyrene type elastomers include block copolymers comprising a vinyl aromatic compound and a conjugated diene compound and a hydrogenation product thereof (hereinafter referred to as a hydrogenated block copolymer), and more specifically a block copolymer comprising polymer blocks A mainly comprising at least one vinyl aromatic compound and polymer blocks B mainly comprising at least one conjugated diene compound, and a hydrogenated block copolymer obtained by hydrogenating at least 80% by weight of the aliphatic double bonds assigned to the conjugated diene compound of the above-described block copolymer.

The vinyl aromatic compound(s) constituting polymer blocks A are selected from styrene, α-methylstyrene, vinyltoluene, p-t-butylstyrene, 1,1-diphenylethylene, etc., with styrene being preferred. The conjugated diene compound(s) constituting polymer blocks B are selected from butadiene, isoprene, 1,3-pentadiene, 2,3-dimethyl-1,3-butadiene, etc., with butadiene, isoprene, and a combination thereof being preferred. The microstructure of polymer blocks B is arbitrary. For example, polybutadiene blocks may contain 5 to 65% by weight, and preferably 10 to 50% by weight, of a 1,2-vinyl bond structure. The block copolymer may have a linear, branched or radial molecular structure or an arbitrary combination of these structures.

These block copolymers can be synthesized by, for example, the process described in JP-B-40-23798, in which a vinyl aromatic compound and a conjugated diene compound are block-copolymerized in an inert solvent using a lithium catalyst.

The hydrogenated block copolymer can be obtained by hydrogenation of the above-mentioned vinyl aromatic compound-conjugated diene block copolymer. It is also prepared in accordance with the process disclosed in JP-B-42-8704 or JP-B-43-6636. The most preferred hydrogenated block copolymers are those obtained by using a titanium-based catalyst, which have excellent heat resistance and resistance to thermal deterioration. For example, the above-mentioned block copolymer is hydrogenated in an inert solvent in the presence of a titanium-based catalyst according to the process described in JP-A-59-133203 and JP-A-60-79005. In this case, at least 80% by weight of the aliphatic double bonds assigned to the conjugated diene compound of the above-described block copolymer should be hydrogenated to convert the polymer blocks B mainly comprising the conjugated diene compound to the form of an olefinic compound polymer.

The amount of the non-hydrogenated aliphatic double bond in the hydrogenated block copolymer can easily be measured with a Fourier transform infrared (FT-IR) spectrophotometer, a nuclear magnetic resonance apparatus, etc.

Additionally, modified polyolefin type, diene type or styrene type elastomers which are obtained by reacting 100 parts by weight of these elastomers with 0.01 to 10 parts by weight of at least one modifier selected from an α,β-unsaturated carboxylic acid and a derivative thereof and acrylamide and a derivative thereof in the presence or absence of a radical initiator are also useful as impact modifiers. The α,β-unsaturated carboxylic acid and its derivatives include maleic acid, maleic anhydride, fumaric acid, itaconic acid, acrylic acid, glycidyl acrylate, 2-hydroxyethyl acrylate, methacrylic acid, glycidyl methacrylate, 2-hydroxyethyl methacrylate, crotonic acid, cis-4-cyclohexene-1,2-dicarboxylic acid and its anhydride, endocis-bicyclo[2.2.1]-5-heptene-2,3-dicarboxylic acid and its anhydride, and a maleinimide compound. The acrylamide and its derivatives include acrylamide, methacrylamide, N-[4-( 2,3-epoxypropoxy)-3,5-dimethylphenylmethyl]acrylamide, and N-methylolacrylamide.

The radical initiator which may be used in the above modification is not limited and includes organic peroxides, such as dicumyl peroxide, di-t-butyl peroxide, t-butylcumyl peroxide, 2,5-dimethyl-2,5-di(t-butylperoxy)hexane, 2,5-dimethyl-2,5-di(t-butylperoxy)hexyne-3, n-butyl-4,4-bis(t-butylperoxy) valerate, 1,1-bis(t-butylperoxy)-3,3,5-trimethylcyclohexane, t-butylperoxytriphenylsilane, and t-butylperoxytrimethylsilane. These radical initiators may be used either individually or in combination of two or more thereof. In addition, 2,3-dimethyl-2,3-diphenylbutane, 2,3-diethyl-2,3-diphenylbutane, 2,3-dimethyl-2,3-di(p-methylphenyl)butane, 2,3-dimethyl-2,3-di(bromophenyl)butane, etc. are also useful as radical initiators for modification.

The radical initiator is usually used in an amount of from 0.01 to 10 parts, and preferably from 0.05 to 5 parts by weight, per 100 parts by weight of the polyolefin type, diene type or polystyrene type elastomer to be modified.

Modification of the polyolefin type, diene type or styrene type elastomers may also be carried out by kneading in a molten state or by mixing in a dissolved state.

Suitable polyolefin type elastomers to be modified include an ethylene-acrylic acid copolymer, an ethylene-methacrylic acid copolymer, an ethylene-glycidyl acrylate copolymer, an ethylene-glycidyl methacrylate copolymer, an ethylene-vinyl acetate copolymer, and an ethylene-maleic anhydride copolymer. Suitable modified polyolefin type elastomers include a maleic anhydride-grafted, glycidyl methacrylate-grafted or N-[4-(2,3-epoxypropoxy)-2,5-dimethylphenylmethyl]acrylamide-modified polymer of an ethylene-propylene-5-ethylidene-2-norbornene copolymer, an ethylene-propylene-dicyclopentadiene copolymer, an ethylene-propylene copolymer or an ethylene-butene-1 copolymer.

Examples of suitable modified diene type elastomers include a maleic anhydride-grafted, glycidyl methacrylate-modified or N-[4-(2,3-epoxypropoxy)-2,5-dimethylphenylmethyl]acrylamide-modified polymer of carboxyl- or epoxy-containing polybutadiene, hydrogenated polybutadiene or hydrogenated polyisoprene.

Examples of suitable polystyrene type elastomers to be modified include a styrene-butadiene block copolymer or a hydrogenation product thereof and a styrene-isoprene block copolymer or a hydrogenation product thereof. Examples of suitable modified polystyrene type elastomers include a maleic anhydride-grafted, glycidyl methacrylate-grafted or N[-4-(2,3-epoxypropoxy)-2,5-dimethylphenylmethyl]acrylamide-modified polymer of a hydrogenated styrene-butadiene block copolymer or a hydrogenated styrene-isoprene block copolymer.

The above-described thermoplastic elastomers may be used in combination with one or more of other thermoplastic elastomers.

Considering the balance between mechanical strength and organic solvent resistance, a mixing ratio of PPS (a) to PPE (b) should range from 10:90 to 90:10, preferably from 20:80 to 80:20, and more preferably from 30:70 to 70:30, by weight. If the proportion of component (a) is less than 10% by weight based on the (a)/(b) mixture, the composition has poor solvent resistance. If it exceeds 90% by weight, sufficient thermal rigidity cannot be obtained. From the viewpoint of rigidity, component (a) is preferably used in a proportion of at least 50% by weight based on the (a)/(b) mixture.

The organophosphorus compound (c) is added in an amount of from 0.1 to 10 parts by weight, and preferably from 0.5 to 5 parts by weight, per 100 parts by weight of the total resinous components (a) and (b). If the proportion of component (c) is less than 0.1 part by weight, sufficient improvement in compatibility between components (a) and (b) cannot be obtained. If it exceeds 10 parts by weight, the composition will have reduced physical properties, such as impact strength.

The basic compound (d) is added in an amount of not more than 10 parts by weight, and preferably not more than 5 parts by weight, per 100 parts by weight of the total resinous components (a) and (b). If the proportion of component (d) exceeds 10 parts by weight, the composition will have reduced physical properties, such as impact strength.

The thermoplastic resin composition of the present invention can be prepared by melt-kneading the above-described components according to kneading techniques commonly employed for general thermoplastic resin compositions. For example, powdered, granular or liquid components are uniformly blended, if desired, together with necessary additives in a Henschel mixer, a ribbon blender, or a twin-cylinder mixer, etc., and the resulting blend is melt-kneaded in a single-screw extruder, a multi-screw extruder, a roll, or a Banbury mixer, etc. at a temperature of from 150° to 370° C., and preferably from 250° to 350° C.

Methods of molding the thermoplastic resin composition of the present invention are not particularly restricted, and any molding techniques commonly employed for thermoplastic resins, such as injection molding, blow molding, extrusion molding, sheet molding, thermoforming, and compression molding, can be employed.

The present invention will now be illustrated in greater detail by way of Examples and Comparative Examples, but it should be understood that the present invention is not deemed to be limited thereto. All the parts and percents are by weight unless otherwise indicated.

The following materials were used in the Examples and Comparative Examples.

PPS:

Toprene T-7 (trade name of PPS produced by Toprene Co., Ltd.).

PPE:

Poly(2,6-dimethyl-1,4-phenylene ether) produced by Nippon Polyether K.K.; intrinsic viscosity: 0.4 dl/g in chloroform at 30° C.

Organophosphorus Compound:

1. Bis(2,6-di-t-butyl-4-methylphenyl)pentaerythritol diphosphite (Mark PEP-36, produced by Asahi Denka Kogyo K.K.; hereinafter referred to as PEP-36)

2. Tris(2,4-di-t-butylphenyl) phosphite (Irgafos 168, produced by Ciba Geigy Ltd., hereinafter referred to as Irgafos)

3. Triphenyl phosphite (hereinafter abbreviated as TPP)

4. Tetrakis(2,4-di-t-butylphenyl)-4,4'-biphenylene diphosphonite (Sandostab PEP Q, produced by Sandoz K.K.; hereinafter referred to as PEP Q)

5. Triphenyl phosphate

6. Tris(isodecyl) phosphite (Mark 3010, produced by Asahi Denka Kogyo K.K.)

Hydrogenated Styrene-Butadiene-Styrene Block Copolymer:

Partially hydrogenated styrene-butadiene-styrene block copolymer ("Kraton G-1651" produced by Shell Chemical Co., Ltd., hereinafter abbreviated as SEBS).

EXAMPLE 1

Seventy parts of PPS, 30 parts of PPE, 1 part of PEP-36, and 0.5 part of sodium ethoxide were dry blended and then melt-kneaded in a laboratory plastomill (manufactured by Toyo Seiki Co., Ltd.) at 310° C. and 180 rpm for 5 minutes. The resulting composition was ground to granules in a mill. The granular composition was compression molded at 310° C. by means of a compression molding machine (manufactured by Toyo Seiki Co., Ltd.) to provide a 2 mm thick sheet. The sheet was heated in a hot air drier at 120° C. for 4 hours to let the PPS crystallize sufficiently. The sheet was then cut to prescribed sizes to provide test specimens for evaluation of various physical properties. Before evaluation, the specimens were preserved in a desiccator for 2 days.

Physical properties and the appearance of the specimens were measured and evaluated according to the following test methods. The results obtained are shown in Table 1 below.

1) Rigidity:

The specimen was subjected to a flexural rigidity test at 23° C. in accordance with JIS K7106.

2) Izod Impact Strength:

Izod impact strength at 23° C. was measured with an Izod impact tester according to JIS K7110 using three thicknesses of a 2 mm thick specimen fixed together.

3) Dispersion State:

A cut area of the specimen was observed under a scanning electron microscope (S-2400, manufactured by Hitachi, Ltd.). The micrograph obtained (1000 or 5000× magnification) was analyzed with an image analyzer (SPICCA II, manufactured by Nippon Avionics Co., Ltd.) to obtain a number-average dispersed particle diameter Dn according to the equation:

$$Dn = \Sigma n_i d_i / \Sigma n_i$$

wherein di represents a dispersed particle diameter, and ni represents the number of dispersed particles having a dispersed particle diameter of di.

4) Appearance:

The appearance of the specimen was observed and rated "good", "medium" (poorer than "good" but still acceptable for practical use), or "bad" (having a rough surface and unsuitable for practical use).

EXAMPLES 2 TO 9 AND COMPARATIVE EXAMPLES 1 TO 7

Test specimens were prepared in the same manner as in Example 1, except for using the resin composition shown in Table 1, and tested in the same manner as in Example 1. The results of evaluation are shown in Table 1.

TABLE 1

| Example No. | Resin Composition (parts) | | | | | Flexural Rigidity (23° C.) (MPa) | Izod Impact Strength (23° C.) | | Dn (μm) | Appearance |
| --- | --- | --- | --- | --- | --- | --- | --- | --- | --- | --- |
| | PPS | PPE | Organo-phosphorus Compound | Basic Compound | SEBS | | Unnotched (J/m) | Notched (J/m) | | |
| Example 1 | 70 | 30 | PEP-36 1 | NaOEt* 0.5 | — | 2620 | 260 | 25 | 0.3 | good |
| Compara. Example 1 | 70 | 30 | PEP-36 1 | — | — | 2640 | 170 | 20 | 0.9 | good |
| Compara. Example 2 | 70 | 30 | — | — | — | 2640 | 140 | 16 | 2.1 | medium |
| Example 2 | 70 | 30 | PEP-36 1 | NaOEt 0.5 | 9 | 2520 | N.B.** | 49 | 0.5 | good |
| Compara. Example 3 | 70 | 30 | — | — | 9 | 2510 | 220 | 12 | >50 | bad |
| Example 3 | 50 | 50 | PEP-36 1 | NaOEt 0.5 | — | 2480 | 150 | 24 | 0.7 | good |
| Compara. Example 4 | 50 | 50 | — | — | — | 2500 | 82 | 17 | 3.5 | medium |
| Example 4 | 30 | 70 | PEP-36 1 | NaOEt 0.5 | — | 2340 | 190 | 26 | 0.5 | good |
| Compara. Example 5 | 30 | 70 | — | — | — | 2320 | 130 | 19 | 2.9 | medium |
| Example 5 | 70 | 30 | PEP Q 2 | NaOEt 0.5 | 9 | 2490 | N.B. | 49 | 0.6 | good |
| Example 6 | 70 | 30 | TPP 1 | NaOEt 0.5 | 9 | 2510 | 410 | 38 | 0.7 | good |
| Example 7 | 70 | 30 | Irgafos 1 | NaOEt 0.5 | 9 | 2500 | 440 | 43 | 0.6 | good |
| Example 8 | 70 | 30 | PEP Q 1 | NaOMe*** 0.5 | 9 | 2490 | N.B. | 41 | 0.6 | good |
| Example 9 | 70 | 30 | PEP-36 1 | NaOH 0.5 | 9 | 2530 | 380 | 41 | 0.8 | good |
| Compara. Example 6 | 70 | 30 | triphenyl phosphate 1 | — | 9 | 2530 | 240 | 15 | 32 | bad |
| Compara. Example 7 | 70 | 30 | Mark3010 1 | — | 9 | 2490 | 280 | 18 | 9.8 | medium |
| Example 10 | 70 | 30 | PEP-36 1 | $K_2CO_3$ 1 | 9 | 2500 | 450 | 45 | 0.7 | good |
| Example 11 | 70 | 30 | PEP-36 1 | $CH_3COOCs$ 0.5 | — | 2630 | 250 | 25 | 0.6 | good |

Note:
*: Sodium ethoxide
**: No breakage
***: Sodium methoxide

EXAMPLE 12

One hundred parts of PPS and 3 parts of thioglycerol as a modifier were uniformly mixed. The mixture was melt-kneaded in a twin-screw extruder at 310° C., extruded from the die into strands, and cut into pellets. No substantial increase in melt flow rate was observed. The resulting modified PPS was designated modified PPS-1.

In 20 ml of 1-chloronaphthalene was dissolved 0.5 g of modified PPS-1 at 220° C. After cooling, 30 ml of methanol were added to the resin solution to precipitate the polymer, which was collected by filtration, dried, and pressed into a sheet. The infrared absorption spectrum of the sheet showed an absorption assigned to the hydroxyalkyl group in the vicinity of 3440 $cm^{-1}$. Comparing with an infrared absorption spectrum calibration curve prepared based on the peak ratio using the peak at 1910 $cm^{-1}$ as an internal standard, the amount of thioglycerol bonded to PPS was found to be about 2%.

Seventy parts of modified PPS-1, 30 parts of PPE, 0.3 part of PEP-36, 0.5 part of sodium ethoxide, and 9 parts of SEBS were dry blended and then melt-kneaded in a laboratory plastomill (manufactured by Toyo Seiki Co., Ltd.) at 310° C. and 180 rpm for 5 minutes and the resulting composition was ground to granules in a mill. Test specimens were prepared from the resulting granular resin composition in the same manner as in Example 1, and the same tests as in Example 1 were conducted. The results obtained are shown in Table 2 below.

EXAMPLE 13 AND COMPARATIVE EXAMPLES 8 TO 10

Test specimens were prepared in the same manner as in Example 1, except for using the resin composition shown in Table 2. The results of evaluation are shown in Table 2.

TABLE 2

| | Example 12 | Example 13 | Compara. Example 8 | Compara. Example 9 | Compara. Example 10 |
| --- | --- | --- | --- | --- | --- |
| Composition (parts): | | | | | |
| Modified PPS-1 | 70 | 60 | — | 70 | — |
| PPS | — | 10 | 70 | — | 50 |
| PPE | 30 | 30 | 30 | 30 | 50 |
| PEP-36 | 0.3 | 0.3 | — | 0.3 | — |

TABLE 2-continued

|  | Example 12 | Example 13 | Compara. Example 8 | Compara. Example 9 | Compara. Example 10 |
|---|---|---|---|---|---|
| NaOEt | 0.5 | 0.5 | — | — | — |
| SEBS | 9 | 9 | 9 | 9 | — |
| Flexural Rigidity (23° C.) (MPa) | 2510 | 2520 | 2510 | 2490 | 2500 |
| Izod Impact Strength (23° C.) (J/m): | | | | | |
| Unnotched | N.B. | N.B. | 220 | 250 | 80 |
| Notched | 48 | 46 | 12 | 17 | 17 |
| Dn (μm) | 0.4 | 0.5 | >50 | 1.8 | 3.5 |
| Appearance | good | good | bad | good | medium |

EXAMPLE 14

One hundred parts of PPS and 3 parts of sodium di(2-ethylhexyl)sulfosuccinate were uniformly mixed. The mixture was melt-kneaded in a twin-screw extruder at 310° C., extruded from the die into strands, and cut into pellets. The resulting modified PPS was designated modified PPS-2. Modified PPS-2 had a melt viscosity of $1.05 \times 10^4$.

In 20 ml of 1-chloronaphthalene was dissolved 0.5 g of modified PPS-2 at 220° C. After cooling, 30 ml of methanol were added to the resin solution to precipitate the polymer, which was collected by filtration, dried, and press molded into a sheet at a temperature of 310° C. The FT-IR spectrum of the sheet showed an absorption assigned to the ester group in the vicinity of 1720 cm$^{-1}$ and an absorption assigned to the sulfo group in the vicinity of 1040 cm$^{-1}$. Comparing with an FT-IR calibration curve previously prepared based on the peak ratio using the peak at 1910 cm$^{-1}$ as an internal standard, the amount of the modifier bonded to PPS was found to be about 2% (corresponding to 0.5 mol %).

Seventy parts of modified PPS-2, 30 parts of PPE, 1 part of PEP-36, 0.5 part of sodium ethoxide, and 9 parts of SEBS were dry blended and then melt-kneaded in a laboratory plastomill (manufactured by Toyo Seiki Co., Ltd.) at 310° C. and 180 rpm for 5 minutes, cooled, and ground to obtain a granular composition. Test specimens were prepared from the resulting granules in the same manner as in Example 1, and the same tests as in Example 1 were conducted. As a result, the flexural rigidity was 2,510 MPa, the unnotched Izod impact strength at 23° C. was 340 J/m, the notched Izod impact strength at 23° C. was 46 J/m, the number-average dispersed particle diameter (Dn) was 0.7 μm, and the appearance was good.

EXAMPLE 15

One hundred parts of PPS and 3 parts of thiomalic acid as a modifier were uniformly mixed. The mixture was melt-kneaded in a twin-screw extruder at 310° C., extruded from the die into strands, and cut to pellets. No substantial increase in melt flow rate was observed. The resulting carboxyl-modified PPS was designated modified PPS-3. GPC analysis of modified PPS-3 revealed no substantial reduction in molecular weight of PPS due to the modification.

In 20 ml of 1-chloronaphthalene was dissolved 0.5 g of modified PPS-3 at 220° C. After cooling, 30 ml of methanol were added to the resin solution to precipitate the polymer, which was collected by filtration, dried, and press molded into a sheet. The FT-IR spectrum of the sheet showed an absorption assigned to the ketone of the carboxyl group in the vicinity of 1730 cm$^{-1}$. Comparing with an FT-IR calibration curve previously prepared based on the peak ratio using the peak at 1910 cm$^{-1}$ as an internal standard, the amount of the modifier bonded to PPS was found to be about 2%.

Seventy parts of modified PPS-3, 30 parts of PPE, 1 part of PEP-36, and 0.5 part of sodium ethoxide were dry blended and then melt-kneaded in a laboratory plastomill (manufactured by Toyo Seiki Co., Ltd.) at 310° C. and 180 rpm for 5 minutes and granulated by means of a mill. Test specimens were prepared from the resulting granular composition in the same manner as in Example 1, and the same tests as in Example 1 were conducted. The results obtained are shown in Table 3 below.

EXAMPLES 16 TO 24 AND COMPARATIVE EXAMPLES 11 TO 14

Test specimens were prepared in the same manner as in Example 15, except for using the resin composition shown in Table 3. The results of testing are shown in Table 3.

TABLE 3

| Example No. | Resin Composition (parts) | | | | | | Flexural Rigidity (23° C.) (MPa) | Izod Impact Strength (23° C.) | | Dn (μm) | Appearance |
|---|---|---|---|---|---|---|---|---|---|---|---|
| | Modified PPS-3 | PPS | PPE | Organo-phosphorus Compound | NaOEt | SEBS | | Unnotched (J/m) | Notched (J/m) | | |
| Example 15 | 70 | — | 30 | PEP-36 1 | 0.5 | — | 2640 | 260 | 25 | 0.4 | good |
| Compara. Example 11 | — | 70 | 30 | — | — | — | 2640 | 140 | 16 | 2.1 | medium |
| Example 16 | 70 | — | 30 | PEP-36 1 | 0.5 | 9 | 2530 | N.B. | 42 | 0.5 | good |
| Compara. Example 12 | — | 70 | 30 | — | — | 9 | 2510 | 220 | 12 | >50 | bad |
| Example 17 | 70 | — | 30 | PEP-36 3 | 1 | 9 | 2520 | 580 | 39 | 0.3 | good |
| Example 18 | 70 | — | 30 | PEP-36 0.3 | 0.5 | 9 | 2530 | N.B. | 52 | 0.4 | good |
| Example 19 | 50 | — | 50 | PEP-36 1 | 0.5 | — | 2490 | 170 | 25 | 0.7 | good |
| Compara. | — | 50 | 50 | — | — | — | 2500 | 80 | 17 | 3.5 | medium |

TABLE 3-continued

| | Resin Composition (parts) | | | | | | Flexural Rigidity (23° C.) (MPa) | Izod Impact Strength (23° C.) | | Dn (μm) | Appearance |
|---|---|---|---|---|---|---|---|---|---|---|---|
| Example No. | Modified PPS-3 | PPS | PPE | Organo-phosphorus Compound | NaOEt | SEBS | | Unnotched (J/m) | Notched (J/m) | | |
| Example 13 | | | | | | | | | | | |
| Example 20 | 30 | — | 70 | PEP-36 1 | 0.5 | — | 2330 | 190 | 25 | 0.6 | good |
| Compara. Example 14 | — | 30 | 70 | — | — | — | 2320 | 130 | 19 | 2.9 | medium |
| Example 21 | 70 | — | 30 | PEP Q 0.3 | 0.5 | 9 | 2520 | N.B. | 48 | 0.3 | good |
| Example 22 | 70 | — | 30 | Irgafos 0.3 | 0.5 | 9 | 2530 | N.B. | 45 | 0.4 | good |
| Example 23 | 70 | — | 30 | TPP 0.3 | 0.5 | 9 | 2520 | N.B. | 50 | 0.3 | good |
| Example 24 | 60 | 10 | 30 | PEP Q 1 | 0.5 | 9 | 2530 | N.B. | 43 | 0.4 | good |

The resin composition comprising (a) PPS, (b), PPE, (c) a specific organophosphorus compound, e.g., bis(2,6-di-t-butyl-4-methylphenyl)pentaerythritol diphosphite, and (d) a basic compound exhibits excellent compatibility between resinous components (a) and (b) and therefore provides molded articles having excellent appearance and high impact strength.

While the invention has been described in detail and with reference to specific examples thereof, it will be apparent to one skilled in the art that various changes and modifications can be made therein without departing from the spirit and scope thereof.

What is claimed is:

1. A thermoplastic resin composition comprising
   (a) from 30 to 70% by weight of polyphenylene sulfide resin,
   (b) from 30 to 70% by weight of polyphenylene ether resin,
   (c) from 0.1 to 10 parts by weight, per 100 parts by weight of the total resinous components (a) and (b), of an organophosphorus compound selected from the group consisting of, bis(2,6-di-t-butyl-4-methylphenyl)pentaerythritol diphosphite, tris(2,4-di-t-butylphenyl) phosphite, triphenyl phosphite and tetrakis(2,4-di-t-butylphenyl)-4,4'-biphenylene diphosphonite, and
   (d) from 0.1 to 10 parts by weight, per 100 parts by weight of the total resinous components (a) and (b), of a basic compound selected from the group consisting of sodium methoxide, sodium ethoxide, sodium hydroxide, potassium carbonate and cesium acetate.

2. A thermoplastic resin composition as claimed in claim 1, wherein component (a) is a modified polyphenylene sulfide resin obtained by modifying a polyphenylene sulfide resin with a compound selected from the group consisting of thioglycerol, sodium di(2-ethylhexyl) sulfosuccinate and thiomalic acid.

3. A thermoplastic resin composition as claimed in claim 1, wherein said composition further comprises (e) from 5 to 40 parts by weight of an impact modifier per 100 parts by weight of the total resinous components (a) and (b).

4. A thermoplastic resin composition as claimed in claim 3, wherein said impact modifier is a hydrogenation product of a styrene-butadiene-styrene block copolymer.

* * * * *